United States Patent
Hammerschmidt

(10) Patent No.: US 11,732,757 B2
(45) Date of Patent: Aug. 22, 2023

(54) PLAIN BEARING

(71) Applicant: SKF MARINE GMBH, Hamburg (DE)

(72) Inventor: Detlef Hammerschmidt, Rostock (DE)

(73) Assignee: SKF MARINE GMBH, Hamburg (DE)

( * ) Notice: Subject to any disclaimer, the term of this patent is extended or adjusted under 35 U.S.C. 154(b) by 132 days.

(21) Appl. No.: 17/259,304

(22) PCT Filed: Jun. 27, 2019

(86) PCT No.: PCT/EP2019/067210
§ 371 (c)(1),
(2) Date: Jan. 11, 2021

(87) PCT Pub. No.: WO2020/011554
PCT Pub. Date: Jan. 16, 2020

(65) Prior Publication Data
US 2021/0254664 A1    Aug. 19, 2021

(30) Foreign Application Priority Data
Jul. 12, 2018  (DE) .......................... 102018211620.2

(51) Int. Cl.
*F16C 39/04*    (2006.01)
*F16C 17/02*    (2006.01)
(Continued)

(52) U.S. Cl.
CPC .............. *F16C 39/04* (2013.01); *F16C 17/02* (2013.01); *F16C 33/1065* (2013.01); *F16C 37/00* (2013.01); *F16C 2210/10* (2013.01)

(58) Field of Classification Search
CPC .. F16C 17/02; F16C 32/0659; F16C 33/1065; F16C 33/107; F16C 33/1075; F16C 37/00; F16C 39/04; F16C 2210/10
See application file for complete search history.

(56) References Cited

U.S. PATENT DOCUMENTS 2,719,065 A * 9/1955 Hornbostel ............. F16C 39/04
                                                     184/6.3
2,824,805 A    2/1958 Hale
(Continued)

FOREIGN PATENT DOCUMENTS

CN          2924144 Y    7/2007
CN        201053451 Y    4/2008
(Continued)

OTHER PUBLICATIONS

Office Action and Search Report from the Chinese Patent Office dated Apr. 15, 2022 in related Chinese application No. CN 201980054450.X, and translation thereof.
(Continued)

*Primary Examiner* — Alan B Waits
(74) *Attorney, Agent, or Firm* — J-Tek Law PLLC; Scott T. Wakeman; Mark A. Ussai

(57) ABSTRACT

A plain bearing includes a base body having a substantially cylindrical bore bounded by a bore surface, and the bore surface has a longitudinal recess in a load-zone region that is open radially inward and has curved ends connected by axially extending sides. A cylindrical shaft extends through the bore and over the load zone and has an outer diameter less than an inner diameter of the bore. A fluid channel has an opening in the recess and provides fluid to the recess at a pressure that is maintained at a level to offset no more than about 40 percent of a force produced by the shaft in the direction of the load zone.

19 Claims, 2 Drawing Sheets

(51) Int. Cl.
*F16C 33/10* (2006.01)
*F16C 37/00* (2006.01)

(56) References Cited

U.S. PATENT DOCUMENTS

| | | | |
|---|---|---|---|
| 3,023,059 A | 2/1962 | Kirk | |
| 3,186,778 A | 6/1965 | Tanekatsu | |
| 3,407,779 A | 10/1968 | Glenn et al. | |
| 3,455,619 A | 7/1969 | Mcgrath | |
| 3,462,204 A | 8/1969 | Sagara | |
| 3,561,830 A | 2/1971 | Orndorff, Jr. | |
| 3,637,273 A | 1/1972 | Omdorff, Jr. | |
| 3,680,932 A * | 8/1972 | Raimondi | F16C 17/022 384/291 |
| 3,746,414 A | 7/1973 | Sudyk et al. | |
| 3,929,393 A | 12/1975 | Marantette et al. | |
| 3,932,004 A | 1/1976 | Orndorff, Jr. | |
| 3,942,850 A | 3/1976 | Minard | |
| 3,971,606 A | 7/1976 | Nakano et al. | |
| 3,993,371 A | 11/1976 | Orndorff, Jr. | |
| 3,998,503 A | 12/1976 | Wyk | |
| 4,044,561 A | 8/1977 | Hohn | |
| 4,149,761 A | 4/1979 | Telle | |
| 4,159,152 A * | 6/1979 | Bjork | F16C 32/0644 384/291 |
| 4,294,494 A * | 10/1981 | Yoshioka | F16C 33/1065 384/313 |
| 4,352,527 A | 10/1982 | Sandstrom | |
| 4,710,034 A * | 12/1987 | Tittizer | F16C 32/0618 384/279 |
| 4,725,151 A | 2/1988 | Orndorff, Jr. | |
| 4,898,769 A | 2/1990 | Laflin et al. | |
| 5,425,675 A | 6/1995 | Pfeifer | |
| 6,241,392 B1 * | 6/2001 | Desai | F16C 33/1075 384/114 |
| 6,997,614 B2 | 2/2006 | Kammel et al. | |
| 2006/0165326 A1 * | 7/2006 | Light | F16C 39/04 384/291 |
| 2006/0251887 A1 | 11/2006 | Welsch | |
| 2016/0215818 A1 * | 7/2016 | Yamato | F16C 32/0685 |

FOREIGN PATENT DOCUMENTS

| | | |
|---|---|---|
| CN | 101614239 A | 12/2009 |
| CN | 103962948 A | 8/2014 |
| CN | 104613094 A | 5/2015 |
| CN | 105805158 A | 7/2016 |
| CN | 106870562 A | 6/2017 |
| CN | 107906124 A | 4/2018 |
| DE | 152611 C | 7/1904 |
| DE | 239641 C | 11/1910 |
| DE | 285157 C | 5/1914 |
| DE | 331734 C | 1/1921 |
| DE | 493304 C | 3/1930 |
| DE | 1425139 A1 | 12/1968 |
| DE | 1758846 A1 | 3/1971 |
| DE | 2427065 A1 | 7/1975 |
| DE | 2443204 A1 | 3/1976 |
| DE | 7430390 U | 7/1976 |
| DE | 2602692 A1 | 8/1976 |
| DE | 2605861 A1 | 8/1976 |
| DE | 2705525 A1 | 8/1977 |
| DE | 2928500 A1 | 1/1981 |
| DE | 3014532 C1 | 10/1981 |
| DE | 3030141 A1 | 2/1982 |
| DE | 3029756 A1 | 5/1982 |
| DE | 3248097 A1 | 6/1984 |
| DE | 343660 C2 | 6/1985 |
| DE | 3715353 A1 | 11/1988 |
| DE | 3718954 A1 | 12/1988 |
| DE | 3916815 A1 | 12/1989 |
| DE | 3931387 A1 | 4/1990 |
| DE | 285157 | 12/1990 |
| DE | 3220595 C2 | 5/1991 |
| DE | 9017703 U1 | 11/1991 |
| DE | 4138708 C2 | 11/2000 |
| DE | 20206418 U1 | 7/2002 |
| DE | 20213002 U1 | 1/2004 |
| DE | 202005006868 U1 | 8/2006 |
| EP | 0566558 B1 | 6/1995 |
| EP | 0692647 A2 | 1/1996 |
| GB | 642940 A | 9/1950 |
| GB | 1161895 A | 8/1969 |
| GB | 2261930 A | 6/1993 |
| JP | 2012062872 A | 3/2012 |
| WO | 2007038681 A2 | 4/2007 |
| WO | 2010103100 A1 | 9/2010 |

OTHER PUBLICATIONS

English translation of the International Search Report dated Jan. 16, 2020 for application No. PCT/EP2019/067210.
English translation of the Written Opinion dated Nov. 5, 2020 for application No. PCT/EP2019/067210.

* cited by examiner

PLAIN BEARING

CROSS-REFERENCE

This application is the U.S. National Stage of International Application No. PCT/EP2019/067210 filed on Jun. 27, 2019, which claims priority to German patent application no. 10 2018 211 620.2 filed on Jul. 12, 2018.

TECHNOLOGICAL FIELD

The invention relates to a plain bearing, in particular for supporting a cylindrical shaft, including an essentially hollow-cylindrical base body having a longitudinal central axis, wherein the shaft is received with radial clearance in a bearing bore of the base body.

BACKGROUND

In the technology, hydrostatic or hydrodynamic plain bearings operating with water or with other fluids find widespread use for low-maintenance and, due to a developing fluid film, practically friction-free supporting of machine parts.

A rubber shaft bearing for the supporting of shafts, in particular on ships and in pump construction, is known from DD 285 157 A5. The number of lubrication and flushing grooves should be reduced to a minimum, wherein the arrangement of the grooves is provided outside the region required for forming a maximum pressure peak. A defined supplying of a lubricating or flushing agent into the bearing sleeve of the plain bearing is not provided. During run-up of the known plain bearing, increased wear can furthermore arise.

SUMMARY

The object of the invention is to specify a wear-reduced-as-much-as-possible plain bearing that functions in a manner drivable by a low-viscosity fluid, such as, for example, water, and essentially not hydrodynamically.

The object mentioned above is achieved by a plain bearing including the characterizing features of patent claim 1, according to which at least one small-surface longitudinal recess is disposed in the region of a load zone of the bearing bore, and for wear reduction of the plain bearing the at least one longitudinal recess can be acted upon by an external fluid supply with a fluid under a pressure. The inventive (hybrid) plain bearing thereby combines the advantages of a hydrostatic plain bearing with those of a hydrodynamic plain bearing. In normal operation, hydrodynamic and also hydrostatic plain bearings are wear-free and low-friction. The inventive plain bearing achieves these advantageous properties even when it is operated with a low-viscosity fluid, such as, for example, water, and essentially does not function hydrodynamically. The high constructive expense—otherwise required in conventional purely hydrostatic plain bearings—in the form of at least one high-pressure pump for the fluid, can be reduced, since only one medium-pressure pump is required. In the inventive plain bearing, the wear behavior is also independent of the relative speed between the supported shaft and a bearing bore of a base body of the plain bearing. In marine applications, a plain bearing load or surface load of up to 0.6 MPa can be realized, which moves into the order of magnitude of a maximum achievable load-bearing capacity of an oil lubrication. In the final analysis, only a slightly higher plain bearing load of up to 0.8 MPa is supportable by an oil lubrication. Here the surface of the longitudinal recesses in the load zone preferably corresponds to less than 50% of the load zone, most preferably less than 30% of the load zone, or less than 10% of the entire inner surface. Furthermore, a length-to-width ratio of the small-surface longitudinal recesses of at least 10:1 is preferably given. The longitudinal recesses are thus small-surface in relation to the entire inner surface of the bearing bore.

The at least one longitudinal recess is preferably connected to the fluid supply by at least one fluid channel. The fluid can consequently be supplied directly to the at least one longitudinal recess.

A pressure of the fluid in the region of an inlet opening of the at least one longitudinal recess is set by the fluid supply such that a plain-bearing load acting on the plain bearing is at most partially compensated. The plain bearing thereby represents a mixed form between a hydrostatic and a hydrodynamic plain bearing. The pressure in the region of the inlet opening is dimensioned such that the plain-bearing load is compensated by approximately 40%. A reduction of wear by approximately 90% consequently results.

The at least one longitudinal recess is open radially inward. A defined pressure build-up of the fluid inside the at least one longitudinal recess is thereby possible. To achieve this objective, the at least one longitudinal recess is embodied axially closed at least regionally on both sides.

The at least one longitudinal recess includes an elongated and narrow as well as approximately oval circumferential contour. In contrast to large-surface hydrostatic lubrication pockets, the at least one longitudinal recess thereby has a narrow and elongated geometry. The narrow contour extends in the axial direction in order to thus interfere as little as possible with the hydrodynamic effect. In addition, a simple manufacturing of the at least one longitudinal recess is thereby possible, for example, by conventional machining methods, in particular milling.

Preferably there is a radial offset between the longitudinal central axis of the base body and a longitudinal central axis of the shaft. Inside the base body, a sufficiently large radial clearance is thereby conferred to the shaft.

In one advantageous design, the base body is formed using a plastic material, and the shaft using a metallic material. Consequently, increased wear (so-called "fretting") in the case of a direct, fluid-free mechanical contact ("dry running") between the shaft and the bearing bore is avoided. The thermoplastic polyurethane is particularly suitable as plastic material. In addition, extensive practical experiments with various plastics have shown that the selection of the plastic has a decisive significance. The desired effect of wear reduction can consequently be achieved only with particularly suitable plastics as bearing material.

According to a technically advantageous further development, the fluid is a liquid medium having a low viscosity, in particular water. A problem-free use of the inventive plain bearing for marine applications and preferably in shipbuilding is thereby given.

In one further design, the base body is disposed in a bearing housing, which is formed in particular using a metallic material. A structurally simpler integration of the plain bearing in a predetermined machine part is consequently ensured, wherein a shaft is to be supported by the plain bearing.

BRIEF DESCRIPTION OF THE DRAWINGS

In the following a preferred exemplary embodiment of the invention is explained in more detail with reference to schematic Figures.

DETAILED DESCRIPTION

Figure 1:
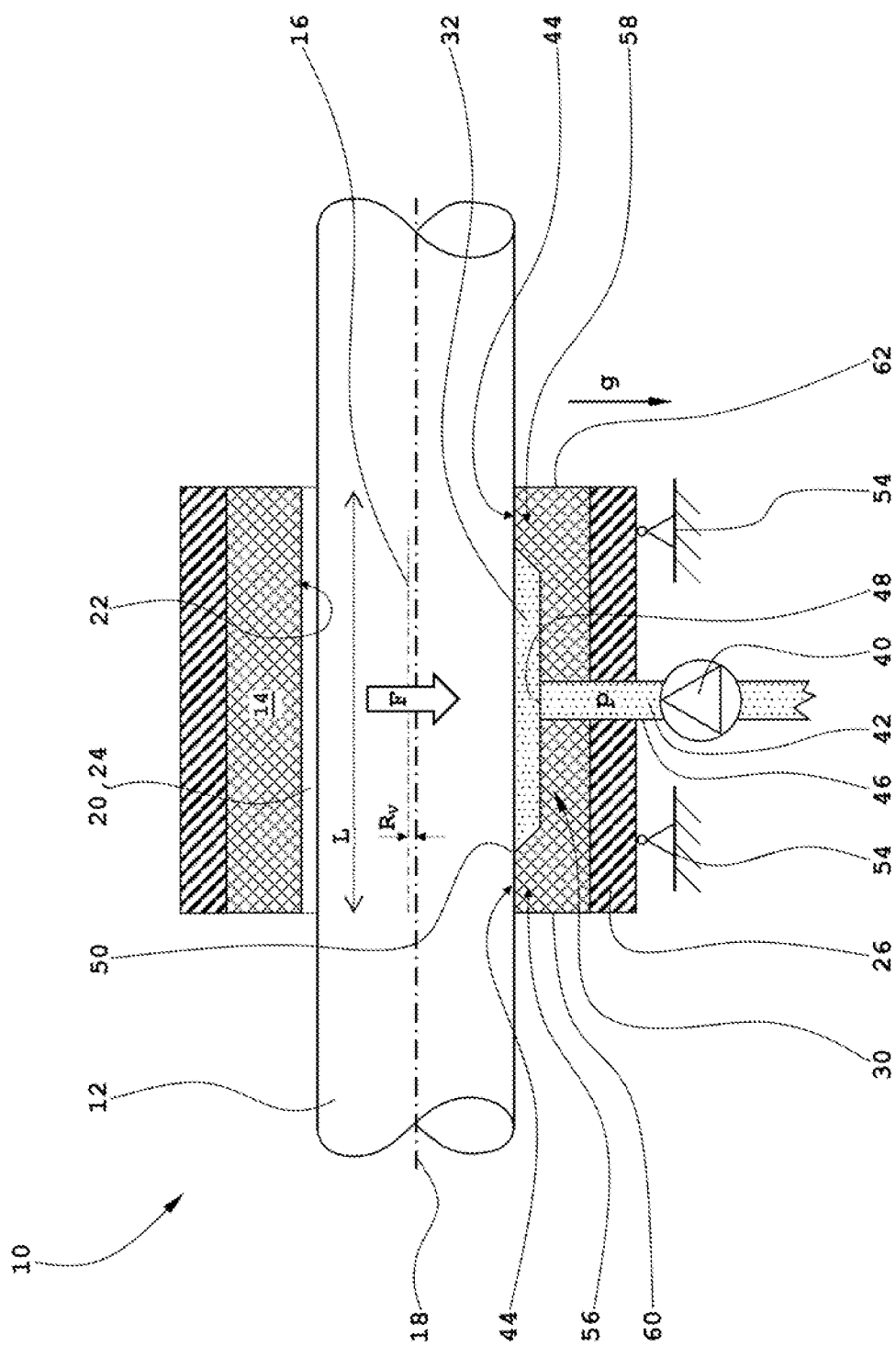
FIG. 1 shows a longitudinal section of an inventive plain bearing.

FIG. 1 illustrates a longitudinal section of an inventive plain bearing. A plain bearing 10 for rotatable supporting of a cylindrical shaft 12 includes an essentially hollow-cylindrical base body 14 having a longitudinal central axis 16. When shaft 12 is stationary, a radial offset $R_V$ exists between the two longitudinal central axes 16, 18, so that the shaft 12 lies rotatably, with radial clearance or eccentrically, in a bearing bore 20 of the base body 14 of the plain bearing 10. With non-rotating shaft 12, between the shaft 12 and a cylindrical bearing-bore inner surface 22 there is consequently a crescent-moon-shaped radial gap 24 lying upward in relation to the direction vector of gravity g. Here the hollow-cylindrical base body 14 of the plain bearing 10 is received, merely by way of example, in a solid bearing housing 26, which can be, for example, a pillow block bearing housing or the like. The symbolically depicted plain-bearing load F acts on the plain bearing 12 as a so-called surface load. The plain bearing 10 is preferably provided for shafts 12 having a large diameter.

At least one inventive small-surface longitudinal recess 32 is provided in the region of a mechanical (main) load zone 30 or fluidic lift zone—wherein the shaft 12 rests at least regionally on the inner bore 20. Using an external fluid supply 40, the at least one longitudinal recess 32 can be acted upon by a fluid 42 for lubricating the plain bearing 10, which fluid 42 is under a pressure p. The at least one longitudinal recess 32 distributes the fluid 42 at least in the region of the lower-lying (main) load zone 30 of the plain bearing 10.

In order to enable a pressure build-up, the at least one longitudinal recess 32 is formed open radially inward and axially closed off on both sides. The at least one small-surface longitudinal recess 32 can have, for example, an approximately groove-shaped, essentially slightly oval or approximately rectangular circumferential contour 50. With rotating shaft 12 and the impinging of the at least one longitudinal recess 32 with the fluid 42 under the pressure p, with the aid of the external fluid supply 40 the contact region 30 is optimally lubricated and cooled.

The fluid 42 can have a low viscosity, so that, for example, water can be used. With stationary shaft 12 and lack of fluid 42 the load zone 30 is essentially congruent with a cylindrically curved abutment surface 44 or a direct contact or touch zone between the shaft 12 and the bearing-bore inner surface 20. Prior to the entry into the fluid supply 40, the fluid 42 is practically pressureless.

The at least one longitudinal recess 32 is hydraulically connected to the fluid supply 40 by a tubular fluid channel 46. The fluid channel 46 is preferably positioned on the base body 14 opposite to the plain-bearing load F. In the region of an inlet opening 48 into the at least one longitudinal recess 32, a pressure p of the fluid 42 is set by the external fluid supply such that a plain-bearing load F or surface load acting on the shaft 12 or the plain bearing 10 is at most partially compensated. Here the plain-bearing load F acts primarily in the region of the load zone 30 inside the bearing bore 20. In particular in the region of the inlet opening 48, the pressure p is preferably set by the external fluid supply 40 such that the plain-bearing load F is compensated by approximately 40% and a reduction of the bearing wear of up to 90% occurs. In the final analysis, the level of pressure p is at a level that falls between the one hydrodynamic and a hydrostatic fluid supply of the plain bearing 10.

Due to the pressure p of the fluid 42 inside the at least one small-surface longitudinal recess 32, as well as the fluid 42 in the immediate vicinity of the longitudinal recess 32, an at most partial compensation of the plain-bearing load F results. The wear behavior between the participating sliding partners, in the form of the bearing bore 20 of the base body 14 of the plain bearing 10 and the shaft 12, consequently changes such that significant wear reduction results.

The at least one longitudinal recess 32 in the region of the load zone 30 is spatially located essentially opposite to the mechanical plain-bearing load F in the bearing bore 20 of the base body 14 of the plain bearing 10.

The at least one longitudinal recess 32 furthermore does not extend over a full axial length L of the base body 14. Rather, a first and second annular land 56, 58 at a first and a second axial end 60, 62 of the base body 14 remain free from the at least one longitudinal recess 32.

The hollow-cylindrical base body 14 of the plain bearing 10 is preferably formed by a suitable plastic material that is low-friction as-possible and medium-resistant but sufficiently mechanically loadable. On the other hand, the shaft 12 and the bearing housing 26 of the plain bearing 10 are preferably manufactured using a metallic material.

Figure 2:
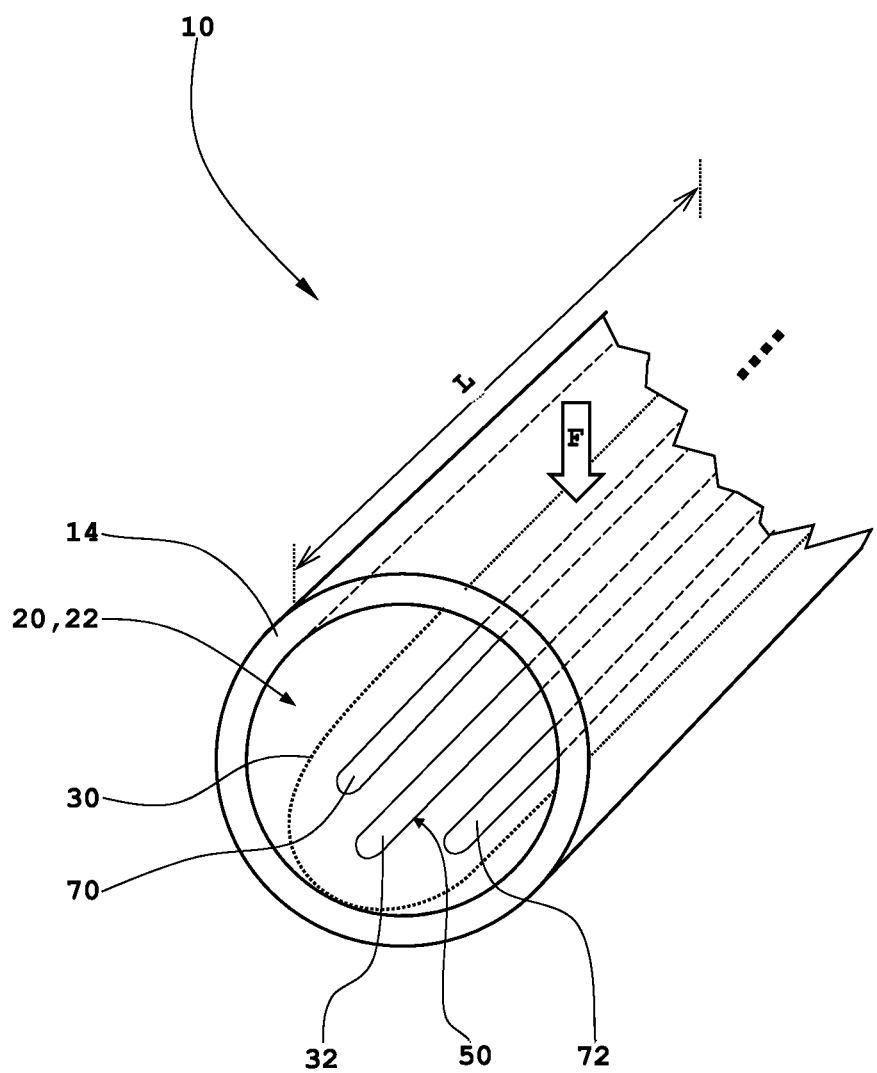
FIG. 2 shows a schematic perspective partial depiction of a base body of the plain bearing of FIG. 1.

FIG. 2 illustrates a schematic perspective partial depiction of a base body of the plain bearing of FIG. 1.

The base body 14 of the plain bearing 10 has an essentially hollow-cylindrical shape having the axial length L. The longitudinal recess 32 with its oval circumferential contour 50, here merely by way of example rectangular or slightly oval, is recessed in the bearing-bore inner surface 22 of the bearing bore 20 of the base body 14. The longitudinal recess 32 is preferably disposed in the bearing bore 20 opposite to the engaging plain-bearing load F.

On both sides here as well as parallel, uniformly and slightly spaced from the longitudinal recess 32, merely by way of example two further, small-surface longitudinal recesses 70, 72, preferably configured structurally identical to the central longitudinal recess 32, extend in the region of the (main) load zone 30 of the plain bearing 10 for larger-scale distribution of the fluid below the shaft not shown here. The three longitudinal recesses 32, 70, 72 preferably extend over a relatively small circumferential angle of the bearing-bore inner surface 22 of at most 120°. In this region of the circumferential angle of the bearing-bore inner surface 22 wherein the three longitudinal recesses 32, 70, 72 are disposed, they occupy a surface of at most half, preferably less than 30%, of that of the bearing-bore inner surface 22. Thus less than 10% of the entire inner bearing bore surface 22.

Depending on the respective requirements of a target application for the plain bearing 10, a number, spatial geometry, axial length, and/or circumference-side position of the longitudinal recesses 32, 70, 72 in the bearing bore 20 of the base body 14 can optionally deviate from the positioning shown here merely by way of example.

The invention relates to a plain bearing, in particular for supporting a cylindrical shaft, including an essentially hollow-cylindrical base body having a longitudinal central axis, wherein the shaft is received with radial clearance in a bearing bore of the base body. According to the invention, it is provided that at least one small-surface longitudinal recess is disposed in the region of a load zone of the bearing bore, and for wear reduction of the plain bearing the at least one longitudinal recess can be acted upon by an external fluid supply with a fluid under a pressure. The plain bearing has wear reduced by up to 90%.

REFERENCE NUMBER LIST

10 Plain bearing
12 Cylindrical shaft
14 Hollow-cylindrical base body
16 Longitudinal central axis (base body)
18 Longitudinal central axis (shaft)
20 Bearing bore
22 Bearing-bore inner surface
24 Radial gap
26 Bearing housing
30 Load zone
32 Small-surface longitudinal recess
40 External fluid supply
42 Fluid
44 Lower abutment surface
46 Fluid channel
48 Inlet opening
50 Circumferential contour
56 First annular land
58 Second annular land
60 First axial end
62 Second axial end
70 Small-surface longitudinal recess
72 Small-surface longitudinal recess
F Plain-bearing load
g Gravity
L Axial length
p Pressure
$R_V$ Radial offset

The invention claimed is:

1. A plain bearing comprising:
a base body having a substantially cylindrical bore bounded by a bore surface and having an inner diameter and a longitudinal center axis,
a first longitudinal recess in a load-zone region of the bore surface, the first recess being open radially inward and having curved ends connected by axially extending sides,
a cylindrical shaft extending through the bore and over the load zone, the cylindrical shaft having a longitudinal center axis and an outer diameter less than the inner diameter of the bore, the shaft producing a downward force in a direction of the load zone,
fluid in the first longitudinal recess, and
a fluid channel in fluid communication with a pressurized fluid supply external to the plain bearing, the fluid channel having an opening in the first longitudinal recess for providing the fluid to the first longitudinal recess at a pressure,
wherein the pressure of the pressurized fluid is maintained at a level to offset no more than about 40 percent of the force.

2. The plain bearing according to claim 1, wherein the base body is formed from a plastic material, and the shaft is formed from a metallic material.

3. The plain bearing according to claim 1, wherein the fluid is water.

4. The plain bearing according to claim 1, wherein the base body is disposed in a bearing housing formed from a metallic material.

5. The plain bearing according to claim 1, wherein the longitudinal center axis of the cylindrical shaft is radially offset from the longitudinal center axis of the bore.

6. The plain bearing according to claim 1, wherein the downward force comprises a weight of the shaft and a load supported by the shaft.

7. The plain bearing according to claim 1, including at least one second longitudinal recess in the load-zone region of the bore surface.

8. The plain bearing according to claim 1, wherein a sum of a first area bounded by a periphery of the first longitudinal recess and a second area bounded by the at least one second longitudinal recess is less than about 10 percent of an area of the bore surface.

9. The plain bearing according to claim 1, wherein a length-to-width ratio of the first longitudinal recess is at least about 10:1.

10. The plain bearing according to claim 9, wherein an area bounded by a periphery of the first longitudinal recess is less than about 10 percent of the bore surface.

11. The plain bearing according to claim 1, wherein the pressure is maintained at a level less than a level required to support hydrodynamic operation of the plain bearing.

12. The plain bearing according to claim 11, wherein the fluid is water.

13. The plain bearing according to claim 1, wherein the fluid is water.

14. A method comprising:
providing a plain bearing comprising:
a base body having a substantially cylindrical bore bounded by a bore surface and having an inner diameter and a longitudinal center axis,
a first longitudinal recess in a load-zone region of the bore surface, the first recess being open radially inward and having curved ends connected by axially extending sides,
a cylindrical shaft extending through the bore and over the load zone, the cylindrical shaft having a longitudinal center axis and an outer diameter less than the inner diameter of the bore, the shaft producing a downward force in a direction of the load zone, and
a fluid channel having an opening in the first longitudinal recess,
the method comprising:
connecting the fluid channel to a pressurized source of fluid,
supplying the fluid through the fluid channel to the first longitudinal recess, and
maintaining a pressure of the fluid in the first longitudinal recess at a level to offset no more than about 40 percent of the force.

15. The method according to claim 14, including at least one second longitudinal recess in the load-zone region of the bore surface, the at least one second recess being open radially inward and having curved ends connected by axially extending sides.

16. The method according to claim 15, wherein a sum of a first area bounded by a periphery of the first longitudinal recess and a second area bounded by the at least one second longitudinal recess is less than about 10 percent of an area of the bore surface.

17. The method according to claim 14,
including, while maintaining the pressure of the fluid at a level to offset no more than about 40 percent of the force, operating the bearing in a substantially non-hydrodynamic manner.

18. The method according to claim 17,
wherein the fluid is water.

19. The method according to claim 14,
wherein the fluid is water.

\* \* \* \* \*